United States Patent
Friedman et al.

[11] Patent Number: 6,065,493
[45] Date of Patent: May 23, 2000

[54] VACUUM RELIEF VALVE FOR SEWAGE HOLDING TANK

[75] Inventors: William J. Friedman, Wooster; Edward McKiernan, Big Prairie; James A. Sigler, Perrysville, all of Ohio

[73] Assignee: Sealand Technology, Inc., Big Prairie, Ohio

[21] Appl. No.: 09/083,280

[22] Filed: May 22, 1998

[51] Int. Cl.[7] ............................. F16K 15/14; E03D 1/34
[52] U.S. Cl. ......................... 137/512.15; 137/454.2; 137/526; 137/854; 4/321; 4/323
[58] Field of Search ............................. 137/512.15, 854, 137/526, 454.2; 4/321, 323; 114/197

[56] References Cited

U.S. PATENT DOCUMENTS

| | | | |
|---|---|---|---|
| 2,270,468 | 1/1942 | Osborn, Jr. | 137/512.15 |
| 5,014,739 | 5/1991 | Csaszar | 137/512.15 |
| 5,060,689 | 10/1991 | Csaszar et al. | 137/512.15 X |
| 5,601,112 | 2/1997 | Sekiya et al. | 137/512.15 |

FOREIGN PATENT DOCUMENTS

| | | | |
|---|---|---|---|
| 1027479 | 4/1958 | Germany | 137/854 |
| 2750912 | 5/1979 | Germany | 137/854 |

*Primary Examiner*—John Rivell
*Attorney, Agent, or Firm*—Nixon & Vanderhye P.C.

[57] ABSTRACT

A plastic sewage holding tank in a boat, associated with a toilet, includes a vent check valve assembly for providing vacuum relief. By mounting the vent check valve in the top of the tank, when the tank is being emptied by rapid pumpout implosion or other damage to the tank is prevented. The vent check valve assembly may include a valve body surface operatively connected to the tank and having a plurality of openings formed in it, and a flexible material diaphragm covering the openings adjacent the inside of the tank, and uncovering openings to allow air flow through the openings substantially only when a vacuum condition exists inside the tank. A plastic disk biases the diaphragm into its opening-covering position, but a partial vacuum of at least about 2–5 inches of water allows air to flow through the openings past the diaphragm.

20 Claims, 3 Drawing Sheets

VACUUM RELIEF VALVE FOR SEWAGE HOLDING TANK

BACKGROUND AND SUMMARY OF THE INVENTION

It has become increasingly common to provide sewage pumpout stations for boats at docks. In such installations a pumpout pump is provide which is connected up to a sewage holding tank (typically of plastic) in the boat, and quickly pumps all of the sewage out of the tank. Most commercial pumps for these pumpout stations have a capacity of up to about 40 gallons per minute (151 liters per minute), although capacities of as high as 170 liters per minute may be expected in the future. When such pumps are operated, it is difficult for the pump operator to know exactly when all the sewage has been pumped out of the holding tank, and the pump may stay in operation for a significant period of time, often up to about 30 seconds, after the tank has already been emptied. It has been recognized that this can exert a substantial strain on the holding tank, and can result in damage to the tank, or an implosion. Damage to the tank may result in leakage of sewage into the environment, obviously a highly undesirable event.

In co-pending application Ser. No. 08/717,904 filed Sep. 23, 1996 (the disclosure of which is incorporated by reference herein) a number of different techniques are described by which damage to the tank as set forth above can be avoided by the provision of various constructions of vacuum relief means. According to the present invention another form of such vacuum relief means is provided which also prevents excess negative pressure inside a holding tank while being pumped out. However the vacuum relief valve assembly according to the present invention opens at about two to three inches of water, as opposed to about 13 inches of water which is typical of the structures illustrated in co-pending application Ser. No. 08/717,904. Also the valve assembly according to the present invention substantially prevents a "spitting" effect which is caused by impacts on the holding tank when full. Other relief valves often allow liquid to exit the valve when the tank is full and impacted with a 10-g load; the valve assembly according to the present invention substantially prevents this from occurring. The valve assembly according to the present invention is capable of providing sufficient air flow into the holding tank so that if the holding tank is emptied by a 170 liter per minute pump remaining in operation for 30 seconds after the plastic holding tank has been emptied, no damage to the holding tank ensues.

According to one aspect of the present invention a boat assembly is provided comprising the following components: A boat hull defining an interior boat volume. A toilet within the interior boat volume. A sewage holding tank operatively connected to the toilet, and also within the interior boat volume, the tank having an inside. An outlet conduit from the holding tank, and including a dockside pumpout fitting. An indicator of the fullness of the holding tank at at least one level of fullness thereof. A gas vent from the holding tank. And a vacuum relief valve assembly for the holding tank to prevent adverse consequences associated with a vacuum condition in the tank. the valve assembly comprising a valve body surface operatively connected to the tank and having a plurality of openings formed therein, and a flexible material diaphragm covering the openings adjacent the inside of the tank, and uncovering openings to allow air flow therethrough substantially only when a vacuum condition exists inside the tank.

The vacuum relief valve assembly is preferably constructed and configured so that the opening when the vacuum inside the holding tank is as low as about 2–5 inches of water (e.g. about 2–3 inches of water) and substantially prevents the "spitting" effect. The valve assembly also preferably comprises the support element which acts to releasably hold the flexible material diaphragm into a position covering the openings. Preferably both the diaphragm and the support element are substantially circular disks with the support disk having a diameter less than that of the diaphragm disk. A fastener assembly, such as a nut, bolt, and washer, is preferably provided to hold the disks in operative association with the valve body surface.

The valve assembly may also comprise a splash protector which is mounted to the valve body on the opposite side from the disks as the openings. The plurality of openings comprises a plurality of openings of at least two different cross sectional areas including smaller cross sectional area openings around the periphery of the valve body. Preferably, the smaller cross sectional area openings are circular, and the difference in diameter between the diaphragm and the support disk is approximately equal to the radius of the small openings.

The diaphragm is preferably of an elastomeric material having a shore A durometer of about 50–70 (e.g. about 60) and a thickness of about 0.055–0.075 inches. Preferably, the support disk comprises, or is equivalent to, a polypropylene disk having a thickness of between about 0.010–0.020 inches. The diaphragm preferably has a diameter of between about 1.85–2.05 inches, and the polypropylene disk preferably has a diameter of between about 1.65–1.95 inches.

According to another aspect of the present invention a sewage holding tank assembly is provided comprising the following components: A plastic sewage holding tank having a top and a bottom, a hollow interior, and an exterior. An outlet conduit from the holding tank and including a dockside pumpout fitting. A vent for the holding tank, adjacent the top thereof for allowing passage of gas under pressure from the tank to the exterior thereof. An inlet conduit for feeding sewage into the holding tank. And a vent check valve assembly mounted to the holding tank top for allowing passage of air from exterior of the tank to the interior of the tank when a significant vacuum condition exists within the tank, the valve assembly comprising a valve body surface operatively connected to the tank and having a plurality of openings formed therein, and a flexible material diaphragm covering the openings adjacent the inside of the tank, and uncovering openings to allow air flow therethrough substantially only when a vacuum condition exists inside the tank.

The valve assembly is mounted to the holding tank by a peripheral upper lip on the valve body, substantially all of the valve body disposed within the tank hollow interior. Other details of the valve assembly are preferably as described above.

According to yet another aspect of the present invention a valve assembly per se, which acts as a vacuum relief device, is provided. The valve assembly comprises the following elements: A valve body comprising a tubular plastic element having an open top (first end) and an open bottom (second end), a valve body surface disposed between the top and bottom and having a plurality of openings formed therein. An elastomeric material valve disk having a substantially circular configuration covering the opening adjacent the second end of the valve body. A flexible support disk of relatively stiff material engaging the valve disk and releasably holding the valve disk in a position covering the openings. And a fastener assembly for releasably holding the valve disk and the support disk entrapped within the valve body surface. The support disk preferably has a diameter about 85-96% that of the valve disk element. The other details of the valve assembly may be as described above.

It is the primary object of the present invention to provide a simple and effective vacuum relief, vent check, valve assembly, which is particularly advantageous for use with sewage holding tanks, such as on boats. This and other objects of the invention will become clear from an inspection of the detailed description of the invention and from the appended claims.

DETAILED DESCRIPTION OF THE DRAWINGS

Figure 1:
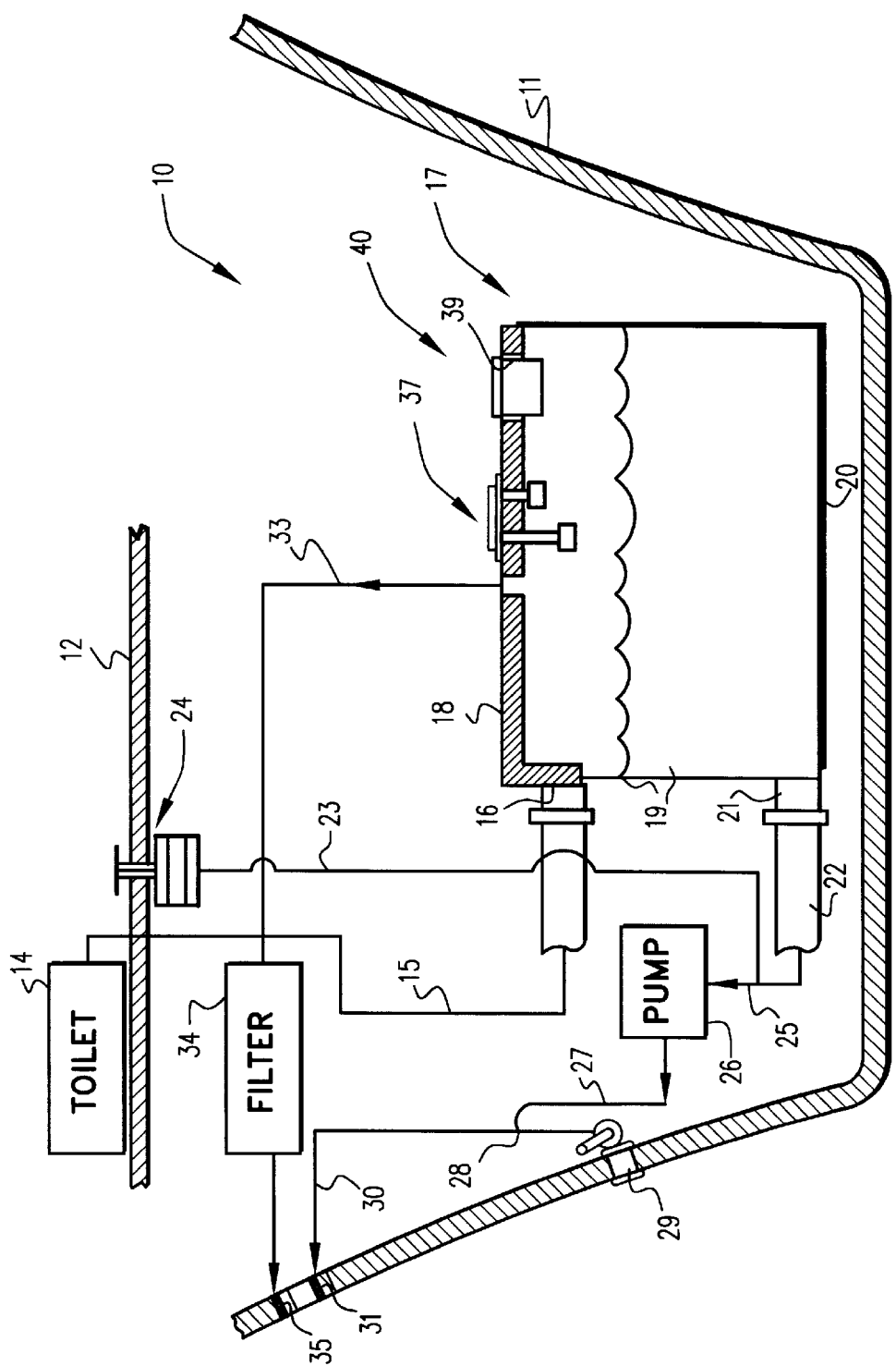
FIG. 1 is a schematic view of a boat assembly according to the present invention incorporating a vacuum relief valve for a sewage holding tank, as according to the invention.

A boat assembly according to the present invention is shown generally by reference numeral 10 in FIG. 1. It includes a boat hull 11 which defines an interior boat volume (perhaps with other structure such as a deck 12 and a super structure above the deck). A toilet 14 is mounted within the interior boat volume (e.g. on deck 12), and is connected by a hose 15 or the like to an inlet 16 to a plastic holding tank 17. The holding tank 17 has a top 18, closed side walls 19, and a bottom 20, and is also mounted within the interior boat volume (typically below the deck 12). The holding tank 17 has an outlet 21 which is connected to an outlet conduit 22. The outlet conduit 22 includes at least one branch 23 which is connected to a dockside pumpout fitting 24 (e.g. associated with deck 12). The outlet conduit 22 can also have a second branch 25 which is connected to a small pump 26 also mounted within the interior boat volume, which in turn is connected by a hose 27, typically having a vented loop 28, to a seacock 29. The vented loop 28 is vented as indicated by vent line 30 and vent opening 31 in hull 11.

As typically associated with a tank 17, a gas vent line 33 is preferably provided, which may have a filter 34 therein, and a vent opening 35 in the hull 11. Also an indicator 37 of the fullness of the tank 17 at at least one fullness level thereof, is provided. The indicator 37 may, for example, be a Tankwatch® level indicator sold by Sealand Technology, Inc. of Big Prairie, Ohio. The indicator 37 typically at least indicates a three-quarters fullness level of the tank 17, and preferably also an approximately full level.

What has heretofore been described is conventional. What is provided according to the present invention in order to prevent an implosion of the tank 17, or other damage thereof, due to rapid pumpout through the outlet conduit 22 and dockside pumpout fitting 24, is the vacuum relief valve assembly 40.

The valve assembly 40 includes a substantially tubular valve body 41, preferably of a relatively rigid and tough plastic, such as injection molded in one piece from ABS. Body 41 includes a first (top) end 42 and a second (bottom) end 43, both of which are substantially open. The body 41 has a peripheral lip 44 adjacent the top end 42 thereof which facilitates mounting of the valve assembly 40 in the opening 39 (see FIG. 4) of the top 18 of the holding tank 17. Any other mounting components can be utilized that are desired, such as an interference fit between the outside circumference of the valve body 41 and the opening 39, or extraneous fasteners, adhesive, or the like. Preferably the peripheral lip or ring 44 mounts the valve assembly 40 so that substantially all of the body 41 us within the interior volume of the tank 17, as seen in FIG. 4.

Figure 2:
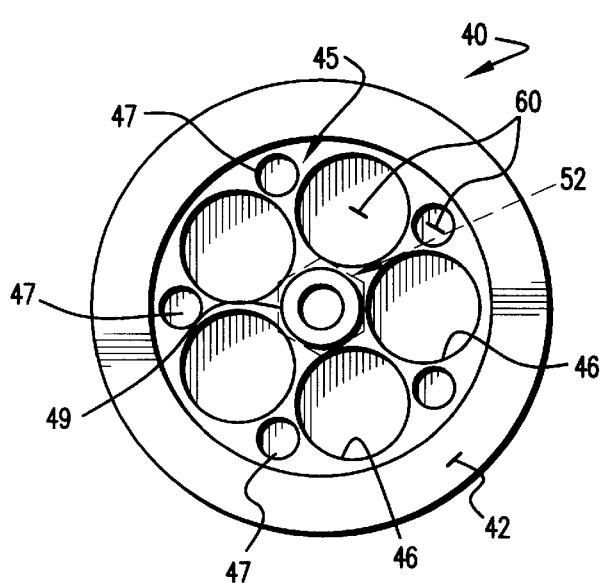
FIGS. 2 and 3 are top and bottom plan views, respectively, of an exemplary configuration of a vacuum relief valve assembly according to the present invention.

The valve assembly 40 further comprises a valve body surface 45 (see FIGS. 2 and 4) between the ends 42, 43 of the body 41 and typically integral therewith, and having a plurality of openings 46, 47 therein. Preferably at least two different sized sets of openings 46, 47 (as seen most clearly in FIG. 2) are provided, larger openings 46 which extend substantially all the way from the center of the surface 45 toward the periphery, and the smaller openings 47 disposed between the larger openings 46 adjacent the periphery. The openings 47 are of a smaller diameter than the openings 46, and preferably both the openings 46, 47 are circular, although other shapes of openings (including slits, rings, polygons, arcs, or the like) may be utilized. In the exemplary embodiment of the invention illustrated in the drawings, for example, the openings 47 may have a diameter of about a quarter of an inch while the openings 46 have a diameter of about 0.625 inches.

Figure 4:
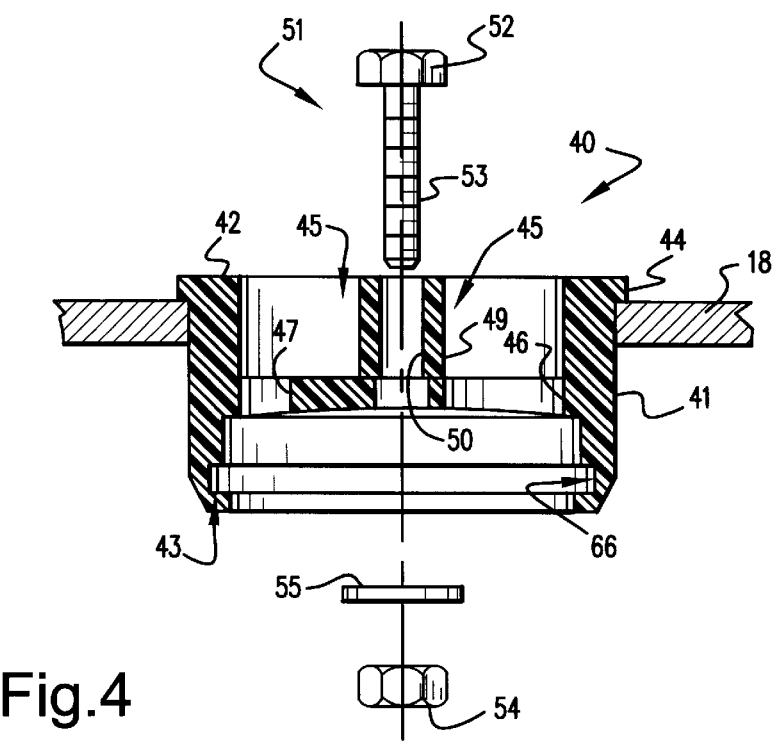
FIG. 4 is a longitudinal view, mostly in cross section but partly in elevation, of the valve assembly of FIGS. 2 and 3 mounted in the holding tank, and with the flexible material diaphragm and supporting disk removed for clarity of illustration.

The valve body 41 also preferably includes a central tube 49 which extends upwardly from the surface 45 to substantially even with the top 42 of the body 41, as seen most clearly in FIG. 4. The tube 49 has a central bore 50 which is associated with a fastener system 51 (see FIG. 4). The fastener system 51 is for holding other valve components (as will be hereinafter described) to the body 41. In the preferred embodiment illustrated in the drawings the fastener assembly 51 comprises a bolt having a head 52 and a screw threaded shank 53, an internal threaded nut 54 for cooperation with the shank 53, and a metal washer 55. The bolt 52, 53 and nut 54 also are preferably made of metal although they (and the washer 55) may be made of hard plastic in some circumstances.

Figure 5:
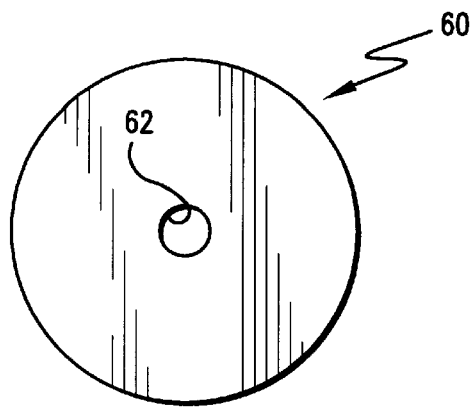
FIGS. 5 and 6 are full size top and side views, respectively, of an exemplary flexible diaphragm valve element according to the present invention.
Figure 6:

The valve assembly 40 further comprises a flexible material diaphragm 60 (seen most clearly in FIGS. 3, 5, and 6) which covers the openings 46, 47 at the bottom-most face of the surface 45 as seen in FIG. 4. That bottom-most face, 59 in FIG. 4, preferably is slightly radiused (e.g. forming a spherical segment based upon an arc/sphere having a radius of about 4.5–6 inches, e.g. about 5.38 inches). The diaphragm 60 preferably comprises a substantially circular disk of an elastomeric material, such as elastomeric plastic, synthetic rubber, or natural rubber. In the preferred embodiment the material of valve disk 60 is nitrile rubber. The valve disk 60 preferably has a Shore A durometer of between about 50–70 (e.g. about 60). In the preferred embodiment illustrated in FIG. 5 valve disk 60 has a diameter of about 1.85–2.05 inches (e.g. about 1.94 inches), with a central opening 62 therein having a diameter of about a quarter of an inch, for receipt of the shank 53 of the fastener system 51.

In the preferred embodiment the valve disk 60 has a thickness of between about 0.055–0.075 inches (e.g. about 0.063 inches).

Figure 3:
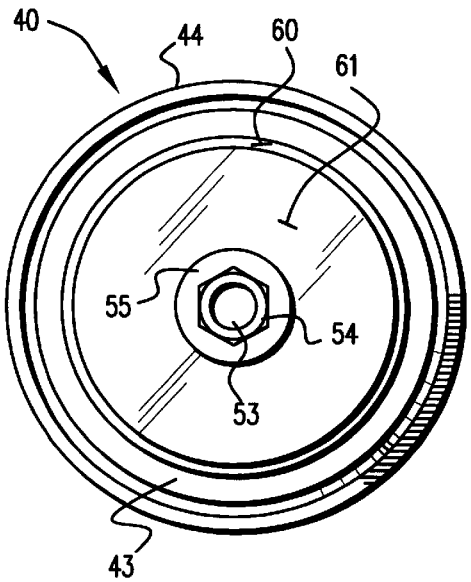
Figure 7:
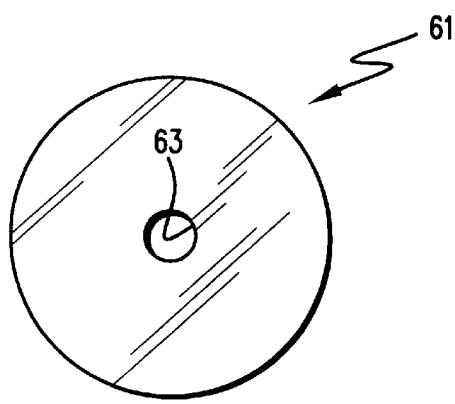
FIGS. 7 and 8 are full size top and side views, respectively, of an exemplary supporting disk element of a vacuum relief valve assembly according to the invention.
Figure 8:
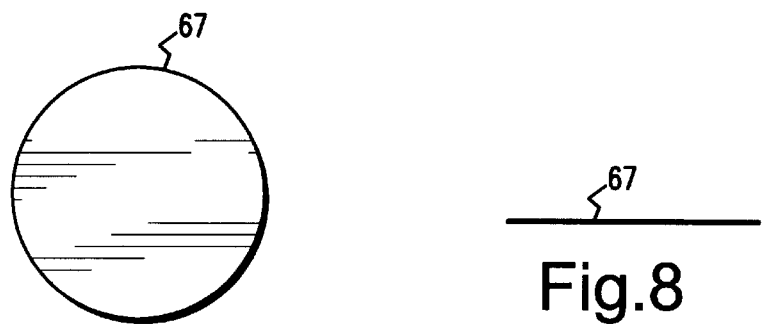

To support the valve element 60 so that it does not sag or flap under normal circumstances, a support element 61 is provided, as seen in FIGS. 3, 7 and 8. The support element 61 preferably has a circular configuration and is in the form of a disk, as seen in FIGS. 3, 7, and 8. Disk 61 is preferably flexible, but made of a relatively rigid material, such as a relatively rigid plastic such as polypropylene. The disk 61 has a diameter that is between about 85–96% of the diameter of the valve disk 60. For example, in the preferred embodiment illustrated in the drawings the disk 61 has a diameter of between about 1.65–1.95 inches, e.g. about 1.81 inches, or about 93–94% that of the valve disk 60.

The support disk 61, when tightened into contact with the shank 53 passing through the opening 63 (FIG. 7) and tightened by the nut 54, holds the valve disk 60 against the surface 59, covering the openings 46, 47. However, the disk 61 has sufficient flexibility so that when a vacuum condition of about 2–5 inches of water (or greater) e.g. about 2–3 inches of water (or greater) exists in the tank 17 both the disk 61 and the disk 60 will be deformed by air rushing through at least some of the openings 46, 47 to equalize the pressure in the tank 17. In the preferred embodiment illustrated, the disk 61 (as seen in FIG. 8) has a thickness of about 0.01–0.02 (e.g. about 0.015 inches).

Figure 9:
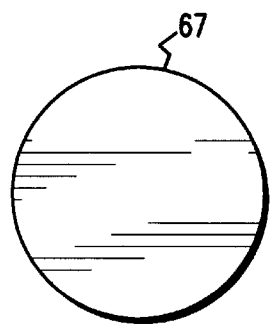
FIG. 9 is a top plan view of an exemplary splash protector disk according to the present invention.

The valve body 41 may also include a ring-shaped channel 66 (see FIG. 4) which can hold the splash protector disk 67 (see FIG. 9) to protect the components 53–55, 61, and 60 from sewage splashing thereon, and facilitating corrosion thereof, or interfering with the performance thereof. For example, the splash protector 67 which is mounted in the ring shaped channel 66 on the opposite side of the valve disk 60 from the support surface 45, may be a disk of any material which allows the substantially free passage of air therethrough, but will substantially prevent liquid from splashing up onto the components 53–55, 61, 60. For example, the protector disk 67 may be a stiff cloth disk, woven or non-woven, made of a non-corrosive material, such as nylon, fiberglass, or the like, and if desired partially impregnated with resin (while not interfering with its ability to pass air therethrough in an effective manner) to enhance is rigidity. The splash protector disk 67 may be replaced as necessary, and the valve assembly 40 may be removed from the opening 39 for this purpose.

In operation, during pumpout of the sewage holding tank 17 (or in other aberrant conditions where a partial vacuum may exist within the tank 17), the valve assembly 40 allows air to flow from the exterior of the tank through at least some of the openings 46, 47, past the disks 60, 61, into the tank 17. The ability of the valve assembly 40 to allow the passage of air typically must be sufficient so that it is capable of providing sufficient air flowing into the tank 17 so that if the tank 17 is emptied by a 170 liter per minute pump remaining in operation for 30 seconds after the plastic tank 17 has been emptied, no damage to the tank 17 ensues. The particular valve assembly 40 according to the present invention also opens quickly (e.g. when there is a partial vacuum only between about 2–5 inches of water), and the configuration of the valve assembly 40 prevents a "spitting effect".

While the preferred use of the valve assembly 40 is in a holding tank, particularly on a boat, it may be used in other circumstances where a check valve is necessary but operates at a relatively low pressure differential, but can allow a relatively high volume flow of fluid therethrough.

It will thus be seen that according to the present invention a highly advantageous boat assembly, sewage holding tank, and valve assembly therefor, have been provided. The valve assembly according to the invention is reliable, relatively inexpensive, and the only movable components thereof are easy to replace or clean.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A boat assembly, comprising:

a boat hull defining an interior boat volume;

a toilet within the interior boat volume;

a sewage holding tank operatively connected to said toilet, and also within said interior boat volume, said tank having an inside;

an outlet conduit from said holding tank, and including a dockside pumpout fitting;

an indicator of the fullness of said holding tank at at least one level of fullness thereof;

a gas vent from said holding tank; and a vacuum relief valve assembly for said holding tank to prevent adverse consequences associated with a vacuum condition in said tank said valve assembly comprising a valve body surface operatively connected to said tank and having a plurality of openings formed therein, a flexible material diaphragm covering said openings adjacent said inside of said tank, and uncovering openings to allow air flow therethrough substantially only when a vacuum condition exists inside said tank; and a support element mounted in contact with said flexible material diaphragm and providing a force on said diaphragm to releasably maintain said diaphragm in a position covering said openings.

2. A boat assembly as recited in claim 1 wherein said vacuum relief valve is constructed and configured so that said flexible material diaphragm uncovers openings to allow air flow therethrough when the vacuum within said holding tank is as low as about 2–5 inches of water, and substantially prevents spitting.

3. A boat assembly as recited in claim 1 wherein said flexible material diaphragm is a substantially circular disk, and wherein said support element is also a substantially circular disk having a diameter less than the diameter of said flexible material diaphragm.

4. A boat assembly as recited in claim 1 wherein said disks are releasably held to said valve body with a fastener assembly.

5. A boat assembly as recited in claim 1 further comprising a splash protector disk mounted to said valve body on the opposite side of said diaphragm and support element from said openings.

6. An assembly as recited in claim 1 wherein said plurality of openings comprise a plurality of openings of at least two different cross sectional areas including smaller cross sectional area openings around the periphery of said valve body.

7. An assembly as recited in claim 1 wherein said plurality of openings comprise a plurality of openings of at least two different cross sectional areas including smaller cross sectional area openings around the periphery of said valve body, said smaller cross sectional area openings being circular;

and wherein the difference in diameter between said diaphragm and said support disk is approximately equal to the radius of said small openings.

8. A boat assembly as recited in claim 1 wherein said diaphragm is of an elastomeric material having a shore A durometer of about 50–70 and a thickness of about 0.055–0.075 inches and wherein said support disk comprises, or is equivalent to, a polypropylene disk having a thickness of between about 0.010–0.020 inches; and wherein said diaphragm has a diameter of between about 1.85–2.05 inches, and said polypropylene disk has a diameter of between about 1.65–1.95 inches.

9. A sewage holding tank assembly comprising:

a plastic sewage holding tank having a top and a bottom, a hollow interior, and an exterior;

an outlet conduit from said holding tank and including a dockside pumpout fitting;

a vent for said holding tank, adjacent said top thereof for allowing passage of gas under pressure from said tank to the exterior thereof;

an inlet conduit for feeding sewage into said holding tank; and a vent check valve assembly mounted to said holding tank top for allowing passage of air from exterior of said tank to the interior of said tank when a significant vacuum condition exists within said tank, said valve assembly comprising a valve body surface operatively connected to said tank and having a plurality of openings formed therein, a flexible material diaphragm covering said openings adjacent said inside of said tank, and uncovering openings to allow air flow therethrough substantially only when a vacuum condition exists inside said tank; and wherein said valve assembly is mounted to said holding tank by a peripheral upper lip on said valve body, substantially all of said valve body disposed within said tank hollow interior.

10. A holding tank assembly as recited in claim 9 wherein said valve assembly is constructed and configured so that said flexible material diaphragm uncovers openings to allow air flow therethrough when the vacuum within said holding tank is as low as about 2–5 inches of water, and substantially prevents spitting.

11. A holding tank assembly as recited in claim 9 wherein said valve assembly is constructed and configured so that said flexible material diaphragm uncovers openings to allow air flow therethrough when the vacuum within said holding tank is as low as about 2–5 inches of water, and substantially prevents spitting.

12. A holding tank assembly as recited in claim 9 wherein said valve assembly further comprises a support element mounted in contact with said flexible material diaphragm and providing a force on said diaphragm to releasably maintain said diaphragm in a position covering said openings.

13. A vent check valve assembly comprising:

a valve body comprising a tubular plastic element having an open top first end and an open bottom second end, a valve body surface disposed between said top and bottom and having a plurality of openings formed therein;

an elastomeric material valve disk having a substantially circular configuration covering said openings adjacent said second end of said valve body;

a flexible support disk of relatively stiff material engaging said valve disk and releasably holding said valve disk in a position covering said openings; and a fastener assembly for releasably holding said valve disk and said support disk entrapped within said valve body surface;

said support disk having a diameter about 85–96% that of said valve disk element.

14. A valve assembly as recited in claim 13 wherein said diaphragm is of an elastomeric material having a shore A durometer of about 50–70 and a thickness of about 0.055–0.075 inches and wherein said support disk comprises, or is equivalent to, a polypropylene disk having a thickness of between about 0.010–0.020 inches; and wherein said diaphragm has a diameter of between about 1.85–2.05 inches, and said polypropylene disk has a diameter of between about 1.65–1.95 inches and wherein said plurality of openings comprise a plurality of openings of at least two different cross sectional areas including smaller cross sectional area openings around the periphery of said valve body, said smaller cross sectional area openings being circular; and wherein the difference in diameter between said diaphragm and said support disk is approximately equal to the radius of said smaller openings.

15. A sewage holding tank assembly comprising:

a plastic sewage holding tank having a top and a bottom, a hollow interior, and an exterior;

an outlet conduit from said holding tank and including a dockside pumpout fitting;

a vent for said holding tank, adjacent said top thereof for allowing passage of gas under pressure from said tank to the exterior thereof;

an inlet conduit for feeding sewage into said holding tank; and a vent check valve assembly mounted to said holding tank top for allowing passage of air from exterior of said tank to the interior of said tank when a significant vacuum condition exists within said tank, said valve assembly comprising a valve body surface operatively connected to said tank and having a plurality of openings formed therein, and a flexible material diaphragm covering said openings adjacent said inside of said tank, and uncovering openings to allow air flow therethrough substantially only when a vacuum condition exists inside said tank, and a support element mounted in contact with said flexible material diaphragm and providing a force on said diaphragm to releasably maintain said diaphragm in a position covering said openings.

16. A holding tank assembly as recited in claim 12 wherein said flexible material diaphragm is a substantially circular disk, and wherein said support element is also a substantially circular disk having a diameter less than the diameter of said flexible material diaphragm.

17. A holding tank assembly as recited in claim 13 wherein said disks are releasably held to said valve body with a fastener assembly.

18. A holding tank assembly as recited in claim 17 wherein said plurality of openings comprise a plurality of openings of at least two different cross sectional areas including smaller cross sectional area openings around the periphery of said valve body, said smaller cross sectional area openings being circular; and wherein the difference in diameter between said diaphragm and said support disk is approximately equal to the radius of said smaller openings.

19. A holding tank assembly as recited in claim 17 further comprising a splash protector disk mounted to said valve body on the opposite side of said diaphragm and support element from said openings.

20. A holding tank assembly as recited in claim 17 wherein said diaphragm is of an elastomeric material having a shore A durometer of about 50–70 and a thickness of about 0.055–0.075 inches and wherein said support disk comprises, or is equivalent to, a polypropylene disk having a thickness of between about 0.010–0.020 inches; and wherein said diaphragm has a diameter of between about 1.85–2.05 inches, and said polypropylene disk has a diameter of between about 1.65–1.95 inches.

* * * * *